US011614331B2

(12) United States Patent
Seah et al.

(10) Patent No.: US 11,614,331 B2
(45) Date of Patent: Mar. 28, 2023

(54) POSITION TRACKING INSIDE METALLIC ENVIRONMENTS USING MAGNETO-ELECTRIC QUASISTATIC FIELDS

(71) Applicants: CHEVRON U.S.A. INC., San Ramon, CA (US); CALIFORNIA INSTITUTE OF TECHNOLOGY, Pasadena, CA (US)

(72) Inventors: Robert Kwan Meng Seah, Cypress, TX (US); Hailing An, Houston, TX (US); Darmindra Arumugam, Pasadena, CA (US)

(73) Assignees: Chevron U.S.A. Inc., San Ramon, CA (US); California Institute of Technology, Pasadena, CA (US)

( * ) Notice: Subject to any disclaimer, the term of this patent is extended or adjusted under 35 U.S.C. 154(b) by 16 days.

(21) Appl. No.: 17/089,496

(22) Filed: Nov. 4, 2020

(65) Prior Publication Data

US 2021/0131810 A1    May 6, 2021

Related U.S. Application Data

(60) Provisional application No. 62/931,141, filed on Nov. 5, 2019.

(51) Int. Cl.
   *G01C 21/20* (2006.01)
   *G01C 21/16* (2006.01)
   *H04W 4/029* (2018.01)
(52) U.S. Cl.
   CPC ....... *G01C 21/206* (2013.01); *G01C 21/1654* (2020.08); *H04W 4/029* (2018.02)

(58) Field of Classification Search
   CPC .. A61M 2205/3523; A61M 2205/0288; A61M 5/172; A61M 25/0127;
   (Continued)

(56) References Cited

U.S. PATENT DOCUMENTS

2006/0235633 A1   10/2006   Simons
2008/0048640 A1    2/2008   Hull
(Continued)

FOREIGN PATENT DOCUMENTS

WO    WO-2018191428 A1 * 10/2018   ............. G01B 7/003

OTHER PUBLICATIONS

Santini, Tales, et al. "In-vivo and numerical analysis of the eigenmodes produced by a multi-level Tic-Tac-Toe head transmit array for 7 Tesla MRI." PloS one 13.11 (2018): e0206127. (Year: 2018).
(Continued)

*Primary Examiner* — Khalid W Shaheed
(74) *Attorney, Agent, or Firm* — Esplin & Associates, PC (57) ABSTRACT

Magneto-electric quasistatic (MEQS) field may be used to track positions of persons and/or objects inside metallic environments. A magneto-electric quasistatic field generator may generate a magneto-electric quasistatic field inside a metallic environment. A magneto-electric quasistatic field detector inside the metallic environment may detect the magneto-electric quasistatic field and generate output signals conveying characteristics of the magneto-electric quasistatic field. The relative position of the magneto-electric quasistatic field detector with respect to the magneto-electric quasistatic field generator may be determined based on the output signals. The position of the magneto-electric quasistatic field detector/generator and/or the position of a person/object carrying the magneto-electric quasistatic field detector/generator may be tracked using the relative position of the magneto-electric quasistatic field detector with respect to the magneto-electric quasistatic field generator.

20 Claims, 5 Drawing Sheets

(58) Field of Classification Search
CPC .......... A61M 2205/3515; H04W 4/029; G01R 33/02; G01R 33/36; G01R 33/028; G11B 5/8408
See application file for complete search history.

(56) References Cited

U.S. PATENT DOCUMENTS

| | | | |
|---|---|---|---|
| 2013/0113468 A1 | 5/2013 | Gao | |
| 2014/0154454 A1 | 6/2014 | Ueki | |
| 2014/0266164 A1* | 9/2014 | Arumugam | G01B 7/004 324/207.15 |
| 2016/0084077 A1 | 3/2016 | Lehr | |
| 2016/0245638 A1* | 8/2016 | Sheinker | G01C 21/005 |
| 2017/0074625 A1 | 3/2017 | Appleby | |
| 2017/0074630 A1 | 3/2017 | Kotsonis | |
| 2020/0190970 A1 | 6/2020 | Alvarez | |
| 2021/0131267 A1 | 5/2021 | Seah | |
| 2021/0135769 A1 | 5/2021 | Seah | |

OTHER PUBLICATIONS

"Downhole Applications of Magnetic Sensors" Sensors (Basel) Oct. 2017: 17(10):2384 by Chinthaka P. Gooneratne, Bodong Li and Timothy E. Moellendick, pp. 1-32.
A. Koutsou et al., "Preliminary localization results with an RFID based indoor guiding system," in Proc. IEEE WISP, 2007, pp. 1-6.
A. Legchenko, M. Descloitres, C. Vincent, H. Guyard, S. Garambois, et al.. Three-dimensional magnetic resonance imaging for groundwater. New Journal of Physics, Institute of Physics: Open Access Journals, 2011, 13, pp. 025022, 18 pages.
Abrudan, et al. Impact of Rocks and Minerals on Underground Magneto-Inductive Communication and Localization, Jun. 9, 2016, pp. 1-12.
B. Denis, J. Keignart, and N. Daniele, "Impact of NLOS propagation upon ranging precision in UWB systems," in Proc. IEEE Conf. Ultra Wideband Syst. Technol., 2003, pp. 379-383.
C. E. Shannon (Jan. 1949). "Communication in the presence of noise" (PDF). Proceedings of the Institute of Radio Engineers. 37 (1): 10-21.
D. Arumugam, J. Griffin, and D. Stancil, "Experimental demonstration of complex image theory and application to position measurement," IEEE Antennas Wireless Propag. Lett., vol. 10, pp. 282-285, 2011.
D. D. Arumugam, "Single-Anchor 2-D Magnetoquasistatic Position Sensing for Short to Long Ranges Above Ground," in IEEE Antennas and Wireless Propagation Letters, vol. 15, pp. 1325-1328, 2016.
D. D. Arumugam, "Through-the-wall indoor tracking and navigation using deep-sub-wavelength magnetoquasistatics," 2017 IEEE International Symposium on Antennas and Propagation & USNC/URSI National Radio Science Meeting, San Diego, CA, 2017, pp. 1409-1410.
D. D. Arumugam, "Through-the-Wall Magnetoquasistatic Ranging," in IEEE Antennas and Wireless Propagation Letters, vol. 16, pp. 1439-1442, 2017.
D. D. Arumugam, J. D. Griffin, D. D. Stancil and D. S. Ricketts, "Experimental study on the effects of groups of people on magnetoquasistatic positioning accuracy," Proceedings of the 2012 IEEE International Symposium on Antennas and Propagation, Chicago, IL, 2012, pp. 1-2.
D. D. Arumugam, M. Sibley, J. D. Griffin, D. D. Stancil and D. S. Ricketts, "An active position sensing tag for sports visualization in American football," 2013 IEEE International Conference on RFID (RFID), Penang, 2013, pp. 96-103.
J. B. Andersen, T. S. Rappaport and S. Yoshida, "Propagation measurements and models for wireless communications channels," in IEEE Communications Magazine, vol. 33, No. 1, pp. 42-49, Jan. 1995.
Legchenko, A., Baltassat, J-M., Beauce, A., and Bernard, J., 2002, Nuclear magnetic resonance as a geophysical tool for hydrogeologists: Journal of Applied Geophysics, v.50, No. 1-2, p. 21-46.
M. M. Khan, Q. H. Abbasi, A. Alomainy and Y. Hao, "Study of line of sight (LOS) and none line of sight (NLOS) ultra wideband off-body radio propagation for body centric wireless communications in indoor," Proceedings of the 5th European Conference on Antennas and Propagation (EUCAP), Rome, 2011, pp. 110-114.
M. Stojanovic and J. Preisig, "Underwater acoustic communication channels: Propagation models and statistical characterization," in IEEE Communications Magazine, vol. 47, No. 1, pp. 84-89, Jan. 2009.
Non-medical applications of NMR and MRI, MRI NMR Magnetic Resonance, retrieved from the internet [https://www.magnetic-resonance.org/ch/19-01 .html]; Web version 11th edition 2017, Ch. 19, pp. 1-4.
Pake, G.E., 1993, Nuclear magnetic resonance in bulk matter: Physics Today, v.46, p. 46-51.
R. V. L. Hartley (Jul. 1928). "Transmission of Information". Bell System Technical Journal, pp. 535-563.
S. S. Ghassemzadeh, L. J. Greenstein, A. Kavcic, T. Sveinsson and V. Tarokh, "UWB indoor path loss model for residential and commercial buildings," 2003 IEEE 58th Vehicular Technology Conference. VTC 2003—Fall (IEEE Cat. No. 03CH37484), 2003, pp. 3115-3119 vol.5.
Sana Ramadan, Master thesis: Underwater Communication Throught Magnetic Induction (MI); retrieved from the internet [(https://dalspace.library.dal.ca/bitstream/handle/10222/73429/Sana-Ramadan-MASc-ECED-Oct. 2017.pdf?sequence=1&isAllowed=y)], Dalhousie University, Halifax, Nova Scotia, Oct. 2017 (55 pages).
Z. Jiang and P. Groves, "NLOS GPS signal detection using a dualpolarisation antenna," GPS Solutions, vol. 18, No. 1, pp. 15-26, 2014.

* cited by examiner

POSITION TRACKING INSIDE METALLIC ENVIRONMENTS USING MAGNETO-ELECTRIC QUASISTATIC FIELDS

CROSS-REFERENCE TO RELATED APPLICATIONS

The present application claims the benefit of U.S. Provisional Application No. 62/931,141, entitled "POSITION TRACKING INSIDE METALLIC ENVIRONMENTS USING MAGNETO-ELECTRIC QUASISTATIC FIELDS," which was filed on Nov. 5, 2019, the entirety of which is hereby incorporated herein by reference.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention. The invention described herein was made in the performance of work under a U.S. Government contract and is subject to the provisions of Public Law 96-517 (35 USC 202) in which the Contractor has elected to retain title.

FIELD

The present disclosure relates generally to the field of position tracking inside metallic environments using magneto-electric quasistatic fields.

BACKGROUND

Tracking positions of persons or object inside metallic environments (e.g., offshore structures, refineries, marine vessels, steel storage tanks, pipes) is difficult due to distortions and/or attenuation in tracking signals caused by metallic structures. For example, metallic structures may limit the use of GPS-based navigation, line-of-sight positioning systems, and/or WiFi/Bluetooth positioning systems.

SUMMARY

This disclosure relates to position tracking. A magneto-electric quasistatic field generator may be configured to generate a magneto-electric quasistatic field inside a metallic environment. Position of the magneto-electric quasistatic field generator may be fixed. A magneto-electric quasistatic field detector may be configured to detect the magneto-electric quasistatic field inside the metallic environment and generate output signals conveying characteristics of the magneto-electric quasistatic field. The magneto-electric quasistatic field detector may be carried by a moving entity that is a vehicle for robotic inspections. A relative position of the magneto-electric quasistatic field detector with respect to the magneto-electric quasistatic field generator may be determined based on the output signals and/or other information.

A system that tracks positions may include one or more electronic storage, one or more processors, one or more magneto-electric quasistatic field generator, one or more magneto-electric quasistatic field detector, and/or other components. The electronic storage may store information relating to magneto-electric quasistatic field, information relating to generation of magneto-electric quasistatic field, information relating to detection of magneto-electric quasistatic field, information relating to magneto-electric quasistatic field generator, information relating to magneto-electric quasistatic field detector, information relating to characteristics of the magneto-electric quasistatic field, information relating to relative position of the magneto-electric quasistatic field detector with respect to the magneto-electric quasistatic field generator, and/or other information.

The magneto-electric quasistatic field generator may be configured to generate a magneto-electric quasistatic field inside a metallic environment. Position of the magneto-electric quasistatic field generator may be fixed. In some implementations, the magneto-electric quasistatic field may include a magnetic quasistatic field and an electric quasistatic field.

The magneto-electric quasistatic field detector may be configured to detect the magneto-electric quasistatic field inside the metallic environment. The magneto-electric quasistatic field detector may be configured to generate output signals conveying characteristics of the magneto-electric quasistatic field. The magneto-electric quasistatic field detector may be carried by a moving entity that is a vehicle for robotic inspections. In some implementations, the characteristics of the magneto-electric quasistatic field may include characteristics of the magnetic quasistatic field and characteristics of the electric quasistatic field.

The processor(s) may be configured by machine-readable instructions. Executing the machine-readable instructions may cause the processor(s) to facilitate tracking positions. The machine-readable instructions may include one or more computer program components. The computer program components may include one or more of a relative position component, and/or other computer program components.

The relative position component may be configured to determine a relative position of the magneto-electric quasistatic field detector with respect to the magneto-electric quasistatic field generator based on the output signals and/or other information. In some implementations, the characteristics of the magnetic quasistatic field may be distorted by a near-field metallic structure. The characteristics of the electric quasistatic field may be used to correct the distortion caused by the near-field metallic structure in the determination of the relative position of the magneto-electric quasistatic field detector with respect to the magneto-electric quasistatic field generator In some implementations, the relative position of the magneto-electric quasistatic field detector with respect to the magneto-electric quasistatic field generator may be determined as a distance and an angle between the magneto-electric quasistatic field detector and the magneto-electric quasistatic field generator. In some implementations, the relative position of the magneto-electric quasistatic field detector with respect to the magneto-electric quasistatic field generator may be determined as differences between translational positions of the magneto-electric quasistatic field detector and the magneto-electric quasistatic field generator. In some implementations, the relative position of the magneto-electric quasistatic field detector with respect to the magneto-electric quasistatic field generator may be determined as differences between rotational positions of the magneto-electric quasistatic field detector and the magneto-electric quasistatic field generator.

In some implementations, the moving entity may comprise a person, an animal, or an object. The vehicle for robotic inspections may be an autonomous vehicle or a remote-controlled vehicle.

In some implementations, tracking or guiding the moving entity in the metallic environment may be performed based on the relative position of the magneto-electric quasistatic field detector with respect to the magneto-electric quasistatic field generator, a map of the metallic environment, and/or other information. Tracking or guiding the moving entity in the metallic environment may be performed further based on computer vision and/or inertial analysis of the moving entity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to position tracking. Magneto-electric quasistatic (MEQS) field may be used to track positions of persons and/or objects inside metallic environments. A magneto-electric quasistatic field generator may generate a magneto-electric quasistatic field inside a metallic environment. A magneto-electric quasistatic field detector inside the metallic environment may detect the magneto-electric quasistatic field and generate output signals conveying characteristics of the magneto-electric quasistatic field. The relative position of the magneto-electric quasistatic field detector with respect to the magneto-electric quasistatic field generator may be determined based on the output signals. The position of the magneto-electric quasistatic field detector/generator and/or the position of a person/object carrying the magneto-electric quasistatic field detector/generator may be tracked using the relative position of the magneto-electric quasistatic field detector with respect to the magneto-electric quasistatic field generator.

Figure 1:
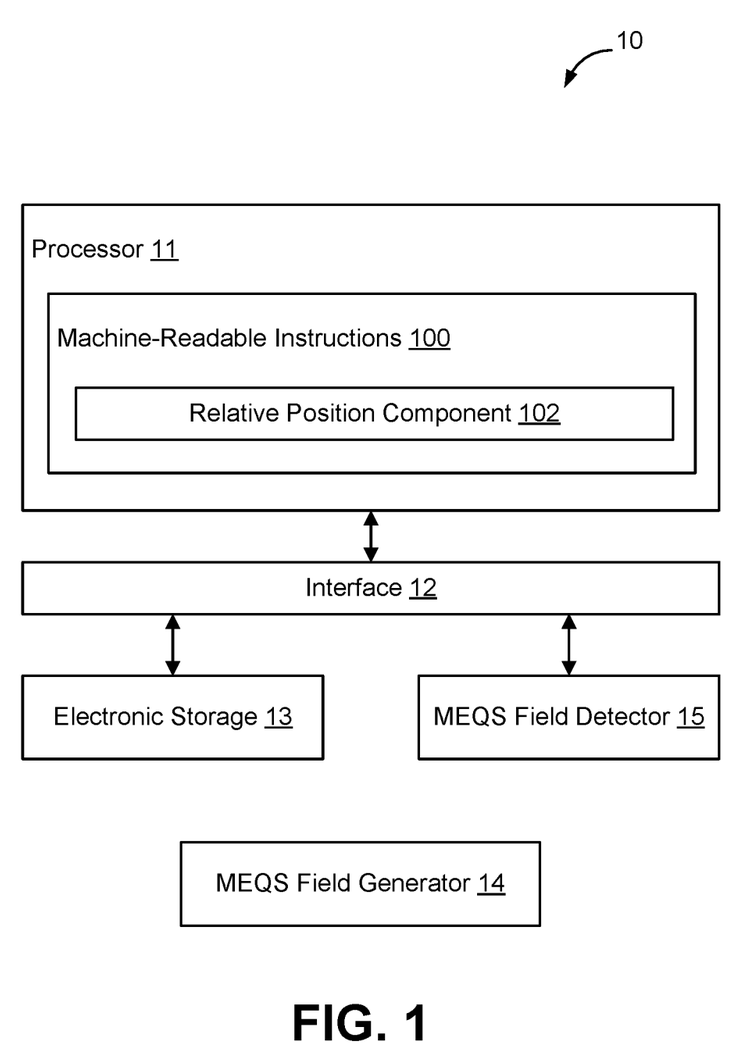
FIG. 1 illustrates an example system that tracks positions.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a magneto-electric quasistatic field generator 14, a magneto-electric quasistatic field detector 15, and/or other components. The magneto-electric quasistatic field generator 14 may generate a magneto-electric quasistatic field inside a metallic environment. The magneto-electric quasistatic field detector 15 may detect the magneto-electric quasistatic field inside the metallic environment. The magneto-electric quasistatic field detector 15 may generate output signals conveying characteristics of the magneto-electric quasistatic field and/or other information. The processor 11 may be determine a relative position of the magneto-electric quasistatic field detector 15 with respect to the magneto-electric quasistatic field generator 14 based on the output signals and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to magneto-electric quasistatic field, information relating to generation of magneto-electric quasistatic field, information relating to detection of magneto-electric quasistatic field, information relating to magneto-electric quasistatic field generator, information relating to magneto-electric quasistatic field detector, information relating to characteristics of the magneto-electric quasistatic field, information relating to relative position of the magneto-electric quasistatic field detector with respect to the magneto-electric quasistatic field generator, and/or other information.

The magneto-electric quasistatic field generator 14 may refer to a device that generates one or more magneto-electric quasistatic fields. The magneto-electric quasistatic field generator 14 may convert energy (e.g., voltage, current, power) into a magneto-electric quasistatic field. The magneto-electric quasistatic field generator 14 may generate a magneto-electric quasistatic field by using static electric charges and moving electric charges. The magneto-electric quasistatic field generator 14 may generate a magneto-electric quasistatic field by transmission of one or more magneto-electric quasistatic waves.

The magneto-electric quasistatic field generator 14 may be configured to generate one or more magneto-electric quasistatic fields inside a metallic environment. A metallic environment may refer to a place, a region, an area, a volume, a setting, a structure, and/or other environment in which metals are present and/or nearby. Metals may be part of a boundary of the metallic environment, part of interior of the metallic environment, and/or part of exterior of the metallic environment. For example, a metallic environment may include one or more of an offshore structure (e.g., offshore oil platforms, offshore wind turbines), a refinery, a marine vessel, a metallic storage tank, a metallic pipe, and/or other metallic environment.

The magneto-electric quasistatic field generator 14 may be located/positioned inside, near, or outside the metallic environment. Other locations/positioning of the magneto-electric quasistatic field generator 14 are contemplated. For example, the magneto-electric quasistatic field generator 14 may be located inside an offshore structure, a refinery, a marine vessel, a metallic storage tank, a metallic pipe, and/or other metallic environment and may generate magneto-electric quasistatic field(s) within the metallic environment from within the metallic environment. The magneto-electric quasistatic field generator 14 may be located nearby an offshore structure, a refinery, a marine vessel, a metallic storage tank, a metallic pipe, and/or other metallic environment and may generate magneto-electric quasistatic field(s) within the metallic environment from nearby the metallic environment. The magneto-electric quasistatic field generator 14 may be located outside an offshore structure, a refinery, a marine vessel, a metallic storage tank, a metallic pipe, and/or other metallic environment and may generate magneto-electric quasistatic field(s) within the metallic environment from outside the metallic environment. Magneto-electric quasistatic field(s) may pass through metals in and/or nearby the metallic environment. The magneto-electric quasistatic field(s) may be generated within one or more mediums within the metallic environment. For example, the magneto-electric quasistatic field(s) may be generated within gas (e.g., air, natural gas), liquid, (e.g., fresh water, sea water, oil, petroleum products), solid (e.g., rock), and/or other mediums. In some implementations, magneto-electric quasistatic field(s) may pass through and out of metallic environment.

A magnetic quasistatic field may refer to a class of electromagnetic field in which a slowly oscillating magnetic field is dominant. A magnetic quasistatic field may be generated by low-frequency induction (e.g., in ones, tens, or hundreds of kilo hertz range) from a magnetic dipole or a current loop. The frequency of the wave(s) used to generate the magnetic quasistatic field may be adjusted based on the desired range at which the magnetic quasistatic field is to be generated.

A magnetic quasistatic field may pass through or near non-metallic materials with little loss/distortion. Characteristics of a magnetic quasistatic field generated from one location/position may be detected at another location/position, and the relative position between the generation point and the detection point may be determined based on the detected characteristics of the magneto-quasistatic field. However, a magnetic quasistatic field may be distorted by metallic materials. For example, a magnetic quasistatic field passing through or nearby metallic materials may be distorted by the metallic materials. The distortion of the magnetic quasistatic field may result in inaccurate determination of the relative position between the generation point and the detection point. That is, the distortion of the magnetic quasistatic field caused by metallic materials in a metallic environment may degrade the accuracy of positioning systems that rely on magneto-quasistatic field.

To correct for the distortion caused by metallic materials, the magnetic quasistatic field may be enhanced with an electric quasistatic field to produce a magneto-electric quasistatic field. A magneto-electric quasistatic field may include one or more magnetic quasistatic fields and one or more electric quasistatic fields. The magnetic quasistatic field(s) and the electric quasistatic field(s) may be generated in within the metallic environment to produce the magneto-electric quasistatic field within the metallic environment. The distortion in magnetic quasistatic field(s) caused by metallic materials may be corrected using electric quasistatic field(s), resulting in improved accuracy of the positioning system.

The magneto-electric quasistatic field detector 15 may refer to a device that detects (e.g., identifies presence/existence of, measures characteristic(s) of) one or more magneto-electric quasistatic fields. The magneto-electric quasistatic field generator 15 may convert electromagnetic waves into energy (e.g., voltage, current, power). The magneto-electric quasistatic field detector 15 may be configured to detect the magneto-electric quasistatic field(s) inside the metallic environment. The magneto-electric quasistatic field detector 15 may be configured to generate output signals conveying one or more characteristics of the magneto-electric quasistatic field(s) and/or other information. A characteristic of a magneto-electric quasistatic field may refer to one or more features and/or one or more quality of the magneto-electric quasistatic field. For example, a characteristic of a magneto-electric quasistatic field may include measurement of the magneto-electric quasistatic field, the strength/intensity of the magneto-electric quasistatic field, the direction of the magneto-electric quasistatic field, the frequency of the magneto-electric quasistatic field, amplitude of the corresponding electromagnetic waves, frequency of the corresponding electromagnetic waves, voltage(s) read by the magneto-electric quasistatic field detector 15 in presence of the magneto-electric quasistatic field, current(s) read by the magneto-electric quasistatic field detector 15 in presence of the magneto-electric quasistatic field, power(s) read by the magneto-electric quasistatic field detector 15 in presence of the magneto-electric quasistatic field, and/or other characteristic of the magneto-electric quasistatic field.

In some implementations, the characteristics of a magneto-electric quasistatic field may include characteristics of the magnetic quasistatic field(s) and characteristics of the electric quasistatic field(s). The characteristics of the magnetic quasistatic field(s) may be distorted by metallic materials in or near the metallic environment. For example, characteristics of the magnetic quasistatic field(s) may be distorted by one or more near-field metallic structures. The characteristics of the electric quasistatic field(s) may be used to correct the distortion in the magnetic quasistatic field(s) caused by the metallic materials.

The magneto-electric quasistatic field generator 14 may include one or more antennas to generate the magneto-electric quasistatic field(s). The antenna(s) may convert energy (e.g., voltage, current, power) into electromagnetic waves, which are transmitted into/inside the metallic environment to generate magneto-electric quasistatic field(s) inside the metallic environment. The magneto-electric quasistatic field generator 14 may include one or more antennas to generate the magnetic quasistatic field(s), one or more antennas to generate the electric quasistatic field(s), and/or one or more antennas to generate both the magnetic quasistatic field(s) and the electric quasistatic field(s). The antenna(s) to generate the magnetic quasistatic field(s) and the antenna(s) to generate the electric quasistatic field(s) may be packaged together or separately.

The magneto-electric quasistatic field detector 15 may include one or more antennas to detect the magneto-electric quasistatic field(s). The antenna(s) may convert electromagnetic waves of the magneto-electric quasistatic field(s) into energy (e.g., voltage, current, power). The magneto-electric quasistatic field detector 15 may include one or more antennas to detect the magnetic quasistatic field(s), one or more antennas to detect the electric quasistatic field(s), and/or one or more antennas to detect both the magnetic quasistatic field(s) and the electric quasistatic field(s). The antenna(s) to detect the magnetic quasistatic field(s) and the antenna(s) to detect the electric quasistatic field(s) may be packaged together or separately.

In some implementations, the antennas of the magneto-electric quasistatic field generator 14 and the magneto-electric quasistatic field detector 15 may be positioned orthogonally. For example, the magneto-electric quasistatic field generator 14 may include three coils to generate the magnetic quasistatic field(s) and the magneto-electric quasistatic field detector 15 may include three coils to detect the magnetic quasistatic field(s). The coils may be positioned at different angles with respect to each other to generate/detect the magnetic quasistatic field(s) in different directions. For example, one coil may be positioned in a leveled orientation. Another coil may be rotated by ninety-degrees about a horizontal axis. Another coil may be rotated by ninety-degrees about a vertical axis. The numbers and/or orientation of coils may determine the number of dimensions in which the position tracking is possible. Other numbers, configurations, and arrangements of antennas are contemplated.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate tracking positions. The machine-readable instructions 100 may include one or more computer program components. The machine-readable instructions 100 may include a relative position component 102, and/or other computer program components.

The processor 11 may be located with or separately from one or more components of the system 10. For example, the processor 11 may be located with the magneto-electric quasistatic field detector 15 and may use the output signals of the magneto-electric quasistatic field detector 15 to perform positioning tracking in real time. For instance, the processor 11 may be packaged with the magneto-electric quasistatic field detector 15 to perform position tracking as the magneto-electric quasistatic field(s) are detected by the magneto-electric quasistatic field detector 15. The processor 11 may be located separately from the magneto-electric quasistatic field detector 15, may obtain information conveyed by the output signals, and may use the information to perform position tracking after data collection has been completed. For instance, information conveyed by the output signals and/or information characterizing the output signals may be stored by the magneto-electric quasistatic field detector 15 for retrieval by the processor 11 after data collection to determine the positions.

The relative position component 102 may be configured to determine a relative position of the magneto-electric quasistatic field detector 15 with respect to the magneto-electric quasistatic field generator 14 based on the output signals generated by the magneto-electric quasistatic field detector 15 and/or other information. A relative position of the magneto-electric quasistatic field detector 15 with respect to the magneto-electric quasistatic field generator 14 may refer to relative translational position and/or relative rotational position between the magneto-electric quasistatic field generator 14 and the magneto-electric quasistatic field detector 15. A relative position of the magneto-electric quasistatic field detector 15 with respect to the magneto-electric quasistatic field generator 14 may refer to relative position from one device to another (e.g., from the magneto-electric quasistatic field generator 14 to the magneto-electric quasistatic field detector 15, from the magneto-electric quasistatic field detector 15 to the magneto-electric quasistatic field generator 14).

In some implementations, determination of the relative position based on the output signals may include determination of the characteristics of the magneto-electric quasistatic field(s) conveyed by the output signals and determination of the relative position based on the characteristics of the magneto-electric quasistatic field(s). For example, the relative position component 102 may determine the relative position of the magneto-electric quasistatic field detector 15 with respect to the magneto-electric quasistatic field generator 14 based on the value of voltage, current, and/or power read by the magneto-electric quasistatic field detector 15 in the presence of the magneto-electric quasistatic field.

The output signals and/or the characteristics of the magnetic quasistatic field(s) may be distorted by metallic materials in or near the metallic environment. Simply using the output signals and/or the characteristics of the magnetic quasistatic field(s) in the metallic environment may result in inaccurate determination of the relative position between the magneto-electric quasistatic field generator 14 and the magneto-electric quasistatic field detector 15. The relative position component 102 may use the output signals for the detected electric quasistatic field(s) to correct the distortions in the output signals for the detected magnetic quasistatic field(s). The relative position component 102 may use the characteristics of the detected electric quasistatic field(s) to correct the distortions in the detected magnetic quasistatic field(s) (e.g., correct the distorted characteristics of the detected magnetic quasistatic field(s)). Such correction of the distortion in the magnetic quasistatic field(s) caused by the metallic materials in determining the relative position of the magneto-electric quasistatic field detector 15 with respect to the magneto-electric quasistatic field generator 14 may result in more accurate determination of the relative position between the magneto-electric quasistatic field generator 14 and the magneto-electric quasistatic field detector 15. The magneto-electric quasistatic field may be used to provide accurate position determination/tracking in one or more non-line of sight applications.

In some implementations, one or more signal processing techniques may be used to correct the distortions using the detected electric quasistatic field(s). For example, readings (e.g., output signals, characteristics conveyed by the output signals) from the detected electric quasistatic field(s) may be used to cancel out distortions in the readings from the detected magnetic quasistatic field(s). Readings from the detected electric quasistatic field(s) may be used to balance out distortions in the readings from the detected magnetic quasistatic field(s). Readings from the detected electric quasistatic field(s) and the readings from the detected magnetic quasistatic field(s) may be compared and/or combined to correct the distortions caused by the metallic materials. Relative position calculation performed based on the detected magnetic quasistatic field(s) may be adjusted based on the readings from the detected electric quasistatic field(s). Other signal processing to correct the distortions using the electric quasistatic field(s) are contemplated.

Figure 3A:
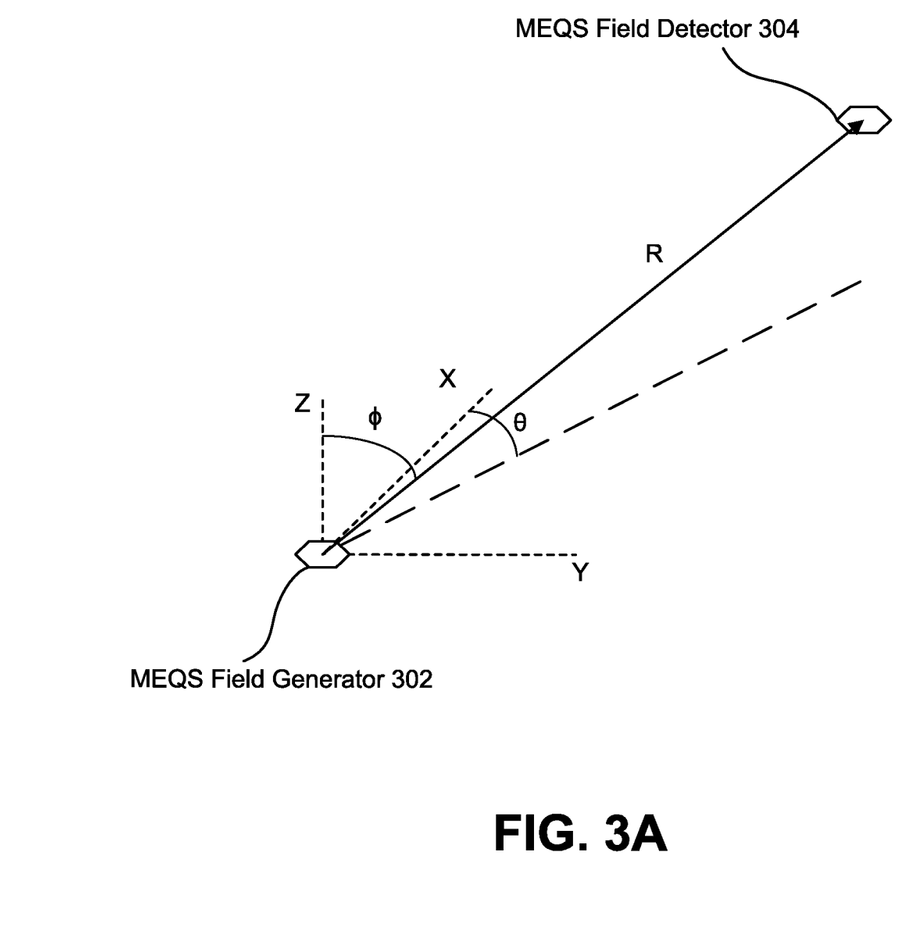
FIGS. 3A and 3B illustrate example positions of a magneto-electric quasistatic field detector and a magneto-electric quasistatic field generator.

In some implementations, the relative position of the magneto-electric quasistatic field detector 15 with respect to the magneto-electric quasistatic field generator 14 may be determined as one or more distances between the magneto-electric quasistatic field detector 15 and the magneto-electric quasistatic field generator 14 and one or more angles (e.g., azimuth angle, altitude angle) between the magneto-electric quasistatic field detector 15 and the magneto-electric quasistatic field generator 14. For example, FIG. 3A illustrates example positions of a magneto-electric quasistatic field detector 304 and a magneto-electric quasistatic field generator 302. The relative position of the magneto-electric quasistatic field detector 304 with respect to the magneto-electric quasistatic field generator 302 may be determined as (1) a distance R between the magneto-electric quasistatic field detector 304 and the magneto-electric quasistatic field generator 302, and (2) angles $\phi$ (from Z-axis toward X-Y plane) and $\theta$ (from X-axis towards Y-axis) indicating the direction of the magneto-electric quasistatic field detector 304 from the magneto-electric quasistatic field generator 302. Other numbers of distances/angles and other coordinate systems are contemplated.

Figure 3B:
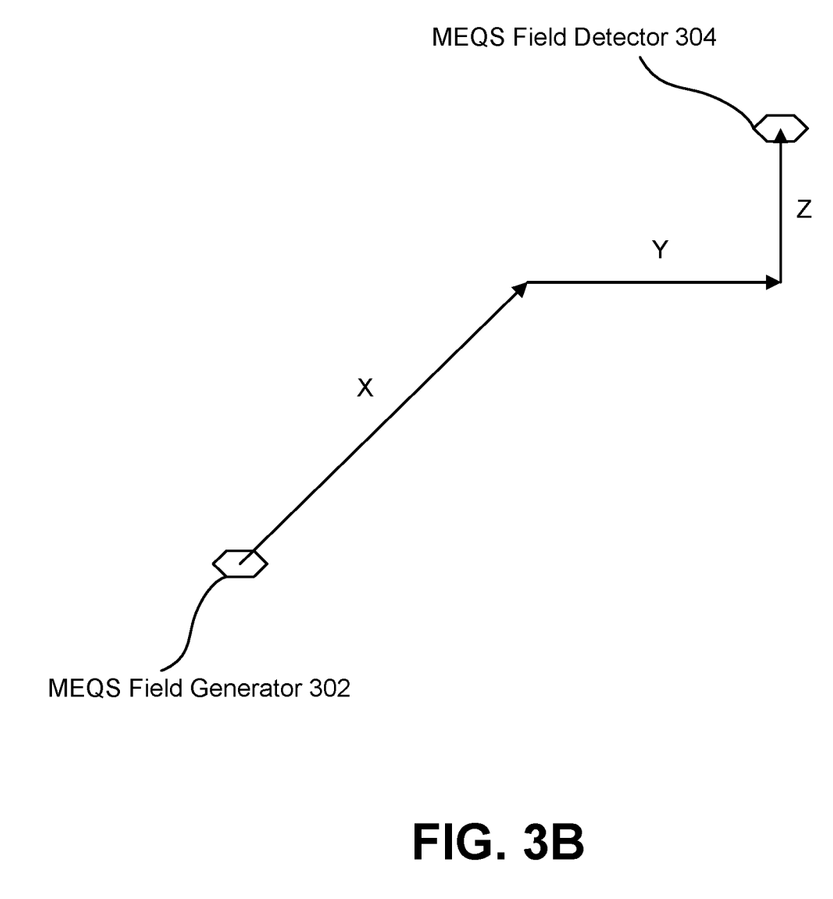

In some implementations, the relative position of the magneto-electric quasistatic field detector 15 with respect to the magneto-electric quasistatic field generator 14 may be determined as differences between one or more translational positions (translational dimensional differences) of the magneto-electric quasistatic field detector 15 and the magneto-electric quasistatic field generator 14. A translation position may refer to a point within a coordinate system, such as a point defined by a X-value, a Y-value, and/or a Z-value in a XYZ coordinate system. Other numbers of translations and other translational axes are contemplated.

For example, FIG. 3B illustrates example positions of a magneto-electric quasistatic field detector 304 and a magneto-electric quasistatic field generator 302. The relative position of the magneto-electric quasistatic field detector 304 with respect to the magneto-electric quasistatic field generator 302 may be determined as (1) a distance X between the magneto-electric quasistatic field detector 304 and the magneto-electric quasistatic field generator 302 along the X-axis, (2) a distance Y between the magneto-electric quasistatic field detector 304 and the magneto-electric quasistatic field generator 302 along the Y-axis, and (3) a distance Z between the magneto-electric quasistatic field detector 304 and the magneto-electric quasistatic field generator 302 along the Z-axis.

Figure 4:
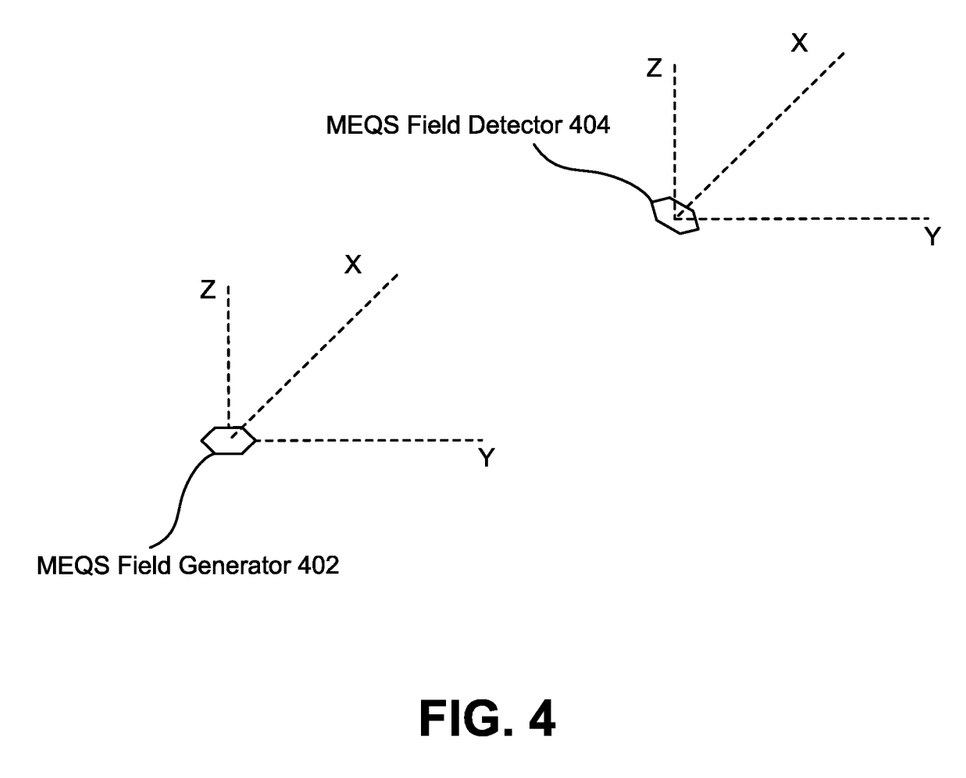
FIG. 4 illustrates example rotational positions of a magneto-electric quasistatic field detector and a magneto-electric quasistatic field generator.

In some implementations, the relative position of the magneto-electric quasistatic field detector 15 with respect to the magneto-electric quasistatic field generator 14 may be determined as differences between one or more rotational positions (rotational dimensional differences) of the magneto-electric quasistatic field detector 15 and the magneto-electric quasistatic field generator 14. A rotational position may refer to a rotation about one or more axis (orientation), such as a rotation about an X-axis, a Y-axis, and/or a Z-axis in a XYZ coordinate system. Other numbers of rotations and other axes of rotation are contemplated.

For example, FIG. 4 illustrates example rotational positions of a magneto-electric quasistatic field detector 404 and a magneto-electric quasistatic field generator 402. The relative position of the magneto-electric quasistatic field detector 404 with respect to the magneto-electric quasistatic field generator 402 may be determined as (1) a difference between the rotation of the magneto-electric quasistatic field generator 402 about the X-axis and the rotation of the magneto-electric quasistatic field detector 404 about the X-axis, (2) a difference between the rotation of the magneto-electric quasistatic field generator 402 about the Y-axis and the rotation of the magneto-electric quasistatic field detector 404 about the Y-axis, and (3) a difference between the rotation of the magneto-electric quasistatic field generator 402 about the Z-axis and the rotation of the magneto-electric quasistatic field detector 404 about the Z-axis.

In some implementations, determining a relative position of the magneto-electric quasistatic field detector 15 with respect to the magneto-electric quasistatic field generator 14 may include determining one or more changes in the relative position between the magneto-electric quasistatic field detector 15 and the magneto-electric quasistatic field generator 14. For example, one or both the magneto-electric quasistatic field detector 15 and the magneto-electric quasistatic field generator 14 may be moving and the relative position component 102 may be configured to determine a relative velocity (e.g., translational and/or rotational velocity) and/or a relative acceleration (e.g., translational and/or rotational acceleration) of the magneto-electric quasistatic field detector 15 with respect to the magneto-electric quasistatic field generator 14 based on the output signals generated by the magneto-electric quasistatic field detector 15 and/or other information. In some implementations, the characteristics of the magneto-electric quasistatic field may be detected and/or recorded with respect to time (e.g., as time series), and the time information of the detected characteristics may be used to determine the relative velocity and/or the relative acceleration of the magneto-electric quasistatic field detector 15 with respect to the magneto-electric quasistatic field generator 14. For instance, time series of relative position information may be used to determine the relative velocity and/or relative acceleration.

The location/position of the magneto-electric quasistatic field generator 14 and/or the magneto-electric quasistatic field detector 15 may be fixed or not-fixed. For example, both the magneto-electric quasistatic field generator 14 and the magneto-electric quasistatic field detector 15 may be fixed at particular locations/positions and the relative position of the magneto-electric quasistatic field detector 15 with respect to the magneto-electric quasistatic field generator 14 may be used to monitor the stationary locations/positions of the magneto-electric quasistatic field generator 14 and the magneto-electric quasistatic field detector 15. The relative position of the magneto-electric quasistatic field detector 15 with respect to the magneto-electric quasistatic field generator 14 may be used to detect movement of one or both of the magneto-electric quasistatic field generator 14 and the magneto-electric quasistatic field detector 15. For instance, a change in the relative position of the magneto-electric quasistatic field detector 15 with respect to the magneto-electric quasistatic field generator 14 may indicate that one or both of the magneto-electric quasistatic field generator 14 and the magneto-electric quasistatic field detector 15 have moved out of place.

As another example, both the magneto-electric quasistatic field generator 14 and the magneto-electric quasistatic field detector 15 may be carried by (e.g., attached to, supported by, held by, and/or otherwise carried by) different moving entities. A moving entity may refer to a living or a non-living entity that may moves translationally and/or rotationally. A moving entity may move during a time duration, may move over a distance, move constantly, may move at intervals of time, and/or may otherwise move. Examples of moving entity includes a person, an animal, an object, or a vehicle. An object may include one or more devices, such as a sensor device (e.g., floating sensor). A vehicle may be controlled by a person inside the vehicle or a person outside the vehicle. A vehicle may be an autonomous vehicle or a remote-controlled vehicle. A vehicle may move on the ground, in the air, in a vacuum, and/or inside a liquid. A vehicle may be used for robotic inspections (robot-based inspections). That is, the moving entity may be a vehicle for robotic inspections, such as autonomous vehicle, remote-controlled/remotely operated vehicle, unmanned aerial vehicle, and/or any other inspection tool. In some implementations, the moving entity (e.g., vehicle, vehicle for robotic inspections) may comprise a person, an animal, or an object. The relative position of the magneto-electric quasistatic field detector 15 with respect to the magneto-electric quasistatic field generator 14 may be used to determine the relative position of the moving entities carrying the magneto-electric quasistatic field detector 15 with respect to the magneto-electric quasistatic field generator 14.

In some implementations, a moving entity may carry both of the magneto-electric quasistatic field generator and the magneto-electric quasistatic field detector. The moving entity may use its magneto-electric quasistatic field generator to generate magneto-electric quasistatic field, which may be detected by a magneto-electric quasistatic field detector of another entity for the other entity to determine the relative position between the moving entities. The moving entity may use its magneto-electric quasistatic field to detect magneto-electric quasistatic field generated by another entity to determine the relative position between the moving entities.

As yet another example, the position of either the magneto-electric quasistatic field generator 14 or the magneto-electric quasistatic field detector 15 may be fixed, while the position of the other device may not be fixed. For example, the position of the magneto-electric quasistatic field generator 14 may be fixed, and the magneto-electric quasistatic field detector 15 may be carried by a moving entity. The position of the magneto-electric quasistatic field detector 15 may be fixed, and the magneto-electric quasistatic field generator 14 may be carried by a moving entity. The fixed position of one device may be used with the relative position of the two devices to determine the absolute position (absolute translational position, absolute rotational position) of the other device.

For example, the magneto-electric quasistatic field generator 14 may be positioned in or near a metallic environment (e.g., offshore structures, refineries, marine vessels) and the magneto-electric quasistatic field detector 15 may be carried by entities to be tracked within the metallic environments (e.g., persons, robots, sensors). For instance, the fixed position of a magneto-electric quasistatic field generator on an offshore structure and relative positions of magneto-electric quasistatic field detectors carried by moving entities may be used to determine absolute positions of the moving entities. The fixed position of a magneto-electric quasistatic field generator on, in, or near a piping system and the relative positions of magneto-electric quasistatic field detectors carried by sensors/vehicles moving/floating within the piping system may be used to determine the positions of the sensors/vehicles within the piping system. The position information of the sensors may be combined with the sensor readings (e.g., pressure, temperature, flowrate, ultrasonic scanning, acoustic scanning, etc.) to accurately measure performance of the piping system, assess the structural integrity of the piping system, and/or otherwise characterize the piping system. The position information of the moving entity may be stored for later retrieval and/or transmitted to one or more devices (e.g., WiFi nodes, access points, monitoring station).

Deployment of devices for magneto-electric quasistatic field position determination may be flexible. For example, a magneto-electric quasistatic field generator may be installed in or near a metallic environment (e.g., metallic platform) to act as a local "GPS" unit. Magneto-electric quasistatic field detectors may be integrated into a moving unit to be used in the metallic environment. For instance, a user may obtain/purchase a magneto-electric quasistatic field detector and installed it in an existing equipment. When the equipment is in the metallic environment, the equipment may latch onto the local signal (the magneto-electric quasistatic field generated by the magneto-electric quasistatic field generator of the metallic environment) to determine its position. As another example, a magneto-electric quasistatic field generator-detector pair may be obtained/purchased. The magneto-electric quasistatic field generator may be paired with the magneto-electric quasistatic field detector. Upon deployment at a metallic environment, the magneto-electric quasistatic field generator may be temporarily installed to provide point-to-point position determination for the paired magneto-electric quasistatic field detector. The magneto-electric quasistatic field generator and the magneto-electric quasistatic field detector may be removed when position determination is not necessary (e.g., work scope is complete).

In some implementations, tracking and/or guiding the moving entit(ies) in the metallic environment may be performed based on the relative position of the magneto-electric quasistatic field detector 15 with respect to the magneto-electric quasistatic field generator 14, one or more maps of the metallic environment, and/or other information. Tracking a moving entity may include determining positions of the moving entity at different times (e.g., following the moving entity within the metallic environment). Guiding a moving entity may include directing/navigating or having an influence on the movement of the moving entity within the metallic environment. A map may include a diagrammatic representation of the metallic environment. A map may include a two-dimensional representation and/or a three-dimensional representation of the metallic environment. The translational and/or rotational positions of the moving entity determined based on the relative position of the magneto-electric quasistatic field detector 15 with respect to the magneto-electric quasistatic field generator 14 may be used to determine path/direction of movement and/or rotation of the moving entity within the metallic environment.

For example, the fixed position of the magneto-electric quasistatic field generator 14 in the metallic environment, the relative position between the magneto-electric quasistatic field generator 14 and the magneto-electric quasistatic field detector 15, and the map of the metallic environment may be used to determine the absolute position of the magneto-electric quasistatic field detector 15 and/or the moving entity carrying the magneto-electric quasistatic field detector 15 in the metallic environment. The map of the metallic environment may be used to determine in which part of the metallic environment the magneto-electric quasistatic field detector 15 and/or the moving entity is positioned (e.g., translational position, orientation with respect to the metallic environment). The position of the magneto-electric quasistatic field detector 15 and/or the moving entity in the metallic environment may be tracked along the map of the environment. The map of the metallic environment may be used to influence the movement of the magneto-electric quasistatic field detector 15 and/or the moving entity (e.g., suggest/control moving direction, rotation, path of movement).

For instance, a moving entity may be positioned in a metallic environment where traditional positioning system (e.g., GPS-based navigation, line-of-sight positioning systems, and/or WiFi/Bluetooth positioning systems) is limited or non-functional. The moving entity may carry a magneto-electric quasistatic field detector, which may be used to detect magneto-electric quasistatic field generated by a magneto-electric quasistatic field generator from a known/fixed position. The relative position (translational position, rotational position) of the moving entity within the metallic environment may be determined based on the magneto-electric quasistatic field detected by the magneto-electric quasistatic field detector, which may be used with the known/fixed position of the magneto-electric quasistatic field generator and a map of the metallic environment to determine the absolute position of the moving entity within the metallic environment. The absolute position of the moving entity may be used for local navigation and/or transmitted to a remote device (e.g., monitoring station) for tracking and/or control purposes. Thus, the magneto-electric quasistatic field may be used to provide non-line of sight position tracking/guiding of entities in metallic environments.

In some implementations, tracking and/or guiding the moving entit(ies) in the metallic environment may be performed further based other localization techniques. For example, tracking and/or guiding the moving entit(ies) in the metallic environment may be performed further based on computer vision and/or inertial analysis of the moving entity. Computer vision may refer to identification/analysis of things, such as the surrounding of a moving entity, using visual information. Examples of computer vision include visual odometry, SLAM, LIDAR, and/or other computer vision. Computer vision may be capable of providing highly accurate information on the position of the moving entity in a metallic environment in ideal conditions, such as in an environment with consistent/large-scale lighting. Computer vision may utilize visual information collected from the environment to generate a three-dimensional model of the environment and/or to determine distances to objects around the moving entity. However, poor lighting condition and/or scattering of the sensing beam may result in inaccurate analysis (e.g., generation of inaccurate three-dimensional model, inaccurate distance measurement).

Inertial analysis of a moving entity may refer to determination of position, speed, and/or acceleration of the moving entity based on inertial data. Inertial data may refer to data characterizing translational and/or rotational position/movement of the moving entity. For example, inertial data may be obtained from one or more of inertial measurement unit, accelerometer, gyroscope, magnetometer, position sensor, and/or other sensors carried by the moving entity. Inertial analysis of the moving entity may use the position and movement of the moving entity at a particular time/place to estimate the position of the moving entity at a future time. For example, the location, orientation, and speed of a moving entity at a moment in time may be used to predict where the moving entity may be located at a later moment in time.

The moving entity may be more accurately tracked and/or guided by using a combination of the magneto-electric quasistatic field position determination and other localization technique(s). For example, position information from the magneto-electric quasistatic field position determination may be augmented with the position information from computer vision and/or inertial analysis, or vice versa. As another example, the moving entity may be tracked and/or guided by switching between magneto-electric quasistatic field position determination and other localization technique (s). For example, when the conditions are adequate/good for computer vision (e.g., sufficient lighting, scattering below a threshold level), computer vision may be used to track and/or guide the moving entity. When the conditions are inadequate/bad for computer vision (e.g., insufficient light, scattering above a threshold level), the magneto-electric quasistatic field position determination may be used to track and/or guide the moving entity. As another example, the magneto-electric quasistatic field may not be detected for a period of time and inertial analysis may be used to estimate the position of the moving sensor during the time that magneto-electric quasistatic field position determination is not available. Other combinations of magneto-electric quasistatic field position determination with other localization techniques are contemplated.

The present disclosure may be utilized to facilitate tracking for a variety of entities and in a variety of environments. For example, the present disclosure may be utilized for localization of autonomous underwater vehicle, remotely operated vehicle, buoy, and/or other entities in one or more environments (e.g., in non-confined environment, such as underwater, on/below sea water, mid-water; in confined environment, such as tanks, pipes). The present disclosure may be utilized to track position of specific equipment and/or different parts of equipment. The present disclosure may be utilized to track position of mooring line elements, riser elements, and/or other equipment. The tracked positions may be used to determine information about the equipment. For example, tracked positions of mooring line elements may be used to measure the displacement of mooring line elements, and tension on the mooring line may be derived from the displacement. Tracked positions of riser elements may be used to measure/monitor riser shapes. Other tracking applications are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the magneto-electric quasistatic field detector 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, the magneto-electric quasistatic field generator 14, and the magneto-electric quasistatic field detector 15 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
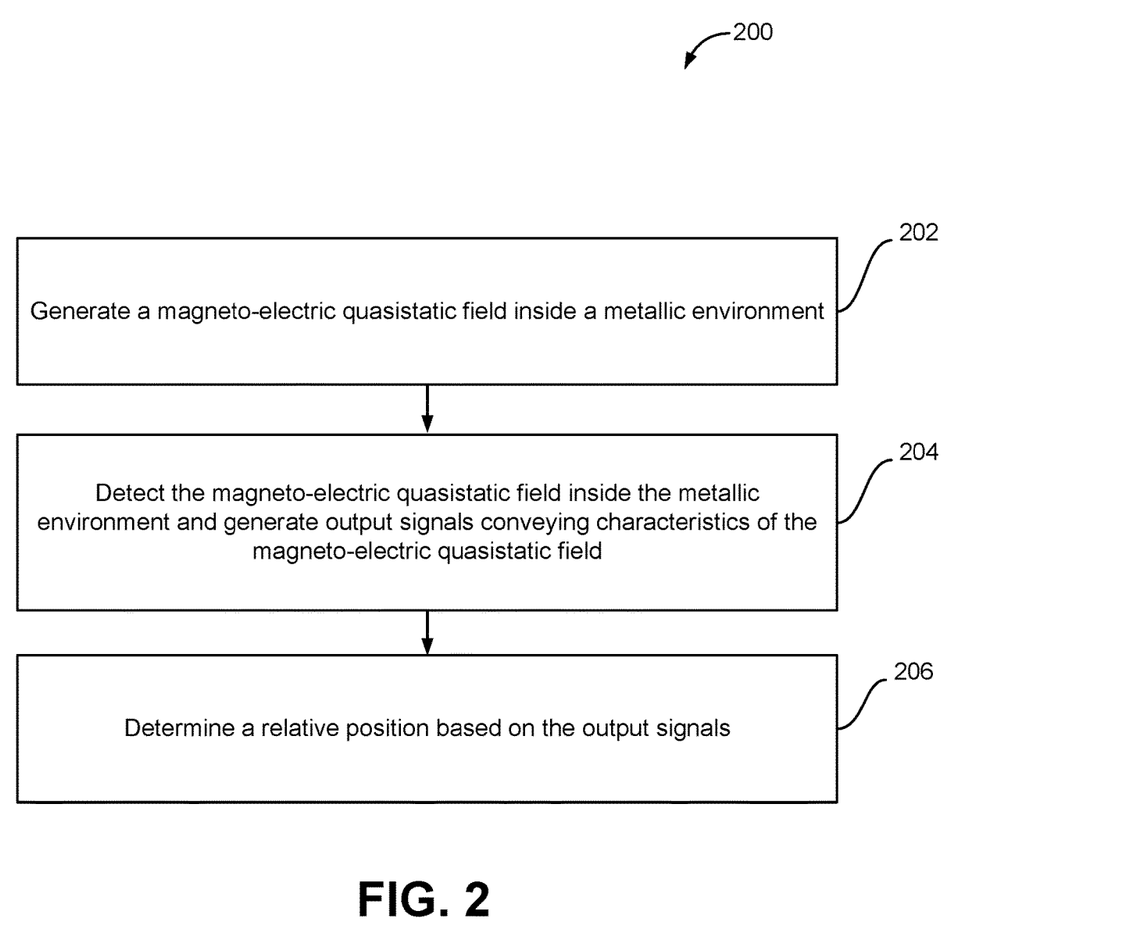
FIG. 2 illustrates an example method for tracking positions.

FIG. 2 illustrates method 200 for tracking positions. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, a magneto-electric quasistatic field may be generated inside a metallic environment. In some implementation, operation 202 may be performed by a component the same as or similar to the magneto-electric quasistatic field generator 14 (Shown in FIG. 1 and described herein).

At operation 204, the magneto-electric quasistatic field may be detected inside the metallic environment. Output signals conveying characteristics of the magneto-electric quasistatic field and/or other information may be generated. In some implementation, operation 204 may be performed by a component the same as or similar to the magneto-electric quasistatic field detector 15 (Shown in FIG. 1 and described herein).

At operation 206, a relative position of the magneto-electric quasistatic field detector 15 with respect to the magneto-electric quasistatic field generator 14 may be determined based on the output signals and/or other information. In some implementation, operation 206 may be performed by a processor component the same as or similar to the relative position component 102 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for tracking positions, the system comprising:
a magneto-electric quasistatic field generator configured to generate a magneto-electric quasistatic field inside a metallic environment, the magneto-electric quasistatic field including a magnetic quasistatic field and an electric quasistatic field, wherein position of the magneto-electric quasistatic field generator is fixed;
a magneto-electric quasistatic field detector configured to detect the magneto-electric quasistatic field inside the metallic environment and generate output signals conveying characteristics of the magneto-electric quasistatic field, the characteristics of the magneto-electric quasistatic field including characteristics of the magnetic quasistatic field and characteristics of the electric quasistatic field, the characteristics of the magnetic quasistatic field distorted by a near-field metallic structure, wherein the magneto-electric quasistatic field detector is carried by a moving entity that is a vehicle for robotic inspections; and one or more processors configured to determine a relative position of the magneto-electric quasistatic field detector with respect to the magneto-electric quasistatic field generator based on the output signals, wherein the distortion of the characteristics of the magnetic quasistatic field caused by the near-field metallic structure are corrected using the characteristics of the electric quasistatic field to improve accuracy in the determination of the relative position of the magneto-electric quasistatic field detector with respect to the magneto-electric quasistatic field generator.

2. The system of claim 1, wherein the relative position of the magneto-electric quasistatic field detector with respect to the magneto-electric quasistatic field generator is determined as a distance and an angle between the magneto-electric quasistatic field detector and the magneto-electric quasistatic field generator.

3. The system of claim 1, wherein the relative position of the magneto-electric quasistatic field detector with respect to the magneto-electric quasistatic field generator is determined as differences between translational positions of the magneto-electric quasistatic field detector and the magneto-electric quasistatic field generator.

4. The system of claim 1, wherein the relative position of the magneto-electric quasistatic field detector with respect to the magneto-electric quasistatic field generator is determined as differences between rotational positions of the magneto-electric quasistatic field detector and the magneto-electric quasistatic field generator.

5. The system of claim 1, wherein the vehicle for robotic inspections is an autonomous vehicle or a remote-controlled vehicle.

6. The system of claim 1, wherein tracking or guiding the moving entity in the metallic environment is performed based on the relative position of the magneto-electric quasistatic field detector with respect to the magneto-electric quasistatic field generator and a map of the metallic environment.

7. The system of claim 6, wherein tracking or guiding the moving entity in the metallic environment is performed further based on computer vision and/or inertial analysis of the moving entity.

8. A method for tracking positions, the method comprising:

generating, by a magneto-electric quasistatic field generator, a magneto-electric quasistatic field inside a metallic environment, the magneto-electric quasistatic field including a magnetic quasistatic field and an electric quasistatic field, wherein position of the magneto-electric quasistatic field generator is fixed;

detecting, by a magneto-electric quasistatic field detector, the magneto-electric quasistatic field inside the metallic environment, wherein the magneto-electric quasistatic field detector is carried by a moving entity that is a vehicle for robotic inspections;

generating, by the magneto-electric quasistatic field detector, output signals conveying characteristics of the magneto-electric quasistatic field the characteristics of the magneto-electric quasistatic field including characteristics of the magnetic quasistatic field and characteristics of the electric quasistatic field, the characteristics of the magnetic quasistatic field distorted by a near-field metallic structure; and determining a relative position of the magneto-electric quasistatic field detector with respect to the magneto-electric quasistatic field generator based on the output signals, wherein the distortion of the characteristics of the magnetic quasistatic field caused by the near-field metallic structure are corrected using the characteristics of the electric quasistatic field to improve accuracy in the determination of the relative position of the magneto-electric quasistatic field detector with respect to the magneto-electric quasistatic field generator.

9. The method of claim 8, wherein the relative position of the magneto-electric quasistatic field detector with respect to the magneto-electric quasistatic field generator is determined as a distance and an angle between the magneto-electric quasistatic field detector and the magneto-electric quasistatic field generator.

10. The method of claim 8, wherein the relative position of the magneto-electric quasistatic field detector with respect to the magneto-electric quasistatic field generator is determined as differences between translational positions of the magneto-electric quasistatic field detector and the magneto-electric quasistatic field generator.

11. The method of claim 8, wherein the relative position of the magneto-electric quasistatic field detector with respect to the magneto-electric quasistatic field generator is determined as differences between rotational positions of the magneto-electric quasistatic field detector and the magneto-electric quasistatic field generator.

12. The method of claim 8, wherein the vehicle for robotic inspections is an autonomous vehicle or a remote-controlled vehicle.

13. The method of claim 8, wherein tracking or guiding the moving entity in the metallic environment is performed based on the relative position of the magneto-electric quasistatic field detector with respect to the magneto-electric quasistatic field generator and a map of the metallic environment.

14. The method of claim 13, wherein tracking or guiding the moving entity in the metallic environment is performed further based on computer vision and/or inertial analysis of the moving entity.

15. The system of claim 1, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes use of the characteristics of the electric quasistatic field to cancel or balance out the distortion of the characteristics of the magnetic quasistatic field.

16. The system of claim 1, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes comparison and/or combination of the characteristics of the electric quasistatic field and the characteristics of the magnetic quasistatic field.

17. The system of claim 1, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes adjustment of the relative position of the magneto-electric quasistatic field detector with respect to the magneto-electric quasistatic field generator based on the characteristics of the electric quasistatic field.

18. The method of claim 8, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes use of the characteristics of the electric quasistatic field to cancel or balance out the distortion of the characteristics of the magnetic quasistatic field.

19. The method of claim 8, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes comparison and/or combination of the characteristics of the electric quasistatic field and the characteristics of the magnetic quasistatic field.

20. The method of claim 8, wherein the correction of the distortion of the characteristics of the magnetic quasistatic field caused by the near-field metallic structure using the characteristics of the electric quasistatic field to improve accuracy in the determination of the relative position of the magneto-electric quasistatic field detector with respect to the magneto-electric quasistatic field generator includes adjustment of the relative position of the magneto-electric quasistatic field detector with respect to the magneto-electric quasistatic field generator based on the characteristics of the electric quasistatic field.

\* \* \* \* \*